United States Patent Office 3,365,347
Patented Jan. 23, 1968

3,365,347
PROCESS FOR THE PRODUCTION OF NUCLEAR SUBSTITUTED AROMATIC AMINES
Richard B. Lund, Whippany, and John Vitrone, Parsippany, N.J., assignors to Allied Chemical Corporation, New York, N.Y., a corporation of New York
No Drawing. Filed July 25, 1963, Ser. No. 297,685
12 Claims. (Cl. 260—570)

This invention relates to a process for reacting an olefinic hydrocarbon with an aromatic amine and more particularly to a process for the production of aralkyl nuclear substituted aromatic amines.

Aralkyl nuclear substituted aromatic amines are known to be useful as crosslinking agents for chlorinated rubbers and epoxy resins and as intermediates in the preparation of polyamides and diisocyanates. Conventional procedures for reacting olefinic hydrocarbons with an aromatic amine, wherein an aralkyl group is substituted for a hydrogen atom in the nucleus of the aromatic amine, involve reaction in the presence of an acid catalyst such as sulfuric acid, and the so-called Lewis acids, e.g. aluminum chloride and zinc chloride. Unfortunately, commercial production of aralkyl nuclear substituted aromatic amines in an efficient and practical manner has been difficult because of the characteristics of the amino group. More specifically, these acid catalysts readily interact with the basic amine group of the aromatic compound to form a salt or similar complex which is undesirable because efficient substitution of the aralkyl group in the nucleus of the aromatic ring depends to a large extent upon an unbound amine group, that is one which has not formed a salt or similar complex. Further, the interaction with the amine group to form a salt not only interferes with the reaction but the aralkyl substituted compound obtained is a salt and must be neutralized with a large excess of base to yield the desired amines. These neutralization procedures, however, are costly and time consuming, and the catalysts are frequently destroyed on contact with the basic reagents and water, precluding their use for future operations. Moreover, the employment of these prior art catalysts in the production of aralkyl nuclear substituted aromatic amines results in low yields, generally of the order of about 10-35%.

It is an object of the present invention to provide a process for the production of aralkyl nuclear substituted aromatic amines by reacting an olefinic hydrocarbon with an aromatic amine in the presence of an acid-activated clay which process is efficient and economical. Another object of the present invention is to obtain higher yields of aralkyl aromatic amines than has heretofore been obtained. A further object is to obtain the aralkyl nuclear substituted aromatic compound free from salt or similar complex formation. A still further object is to provide a process for the production of aralkyl nuclear substituted aromatic amines wherein the catalyst may be recovered and reused. Other objects and advantages will be apparent from the following description.

Broadly contemplated, aralkyl nuclear substituted aromatic amines may be produced in an efficient and economical manner with excellent yields by reacting in admixture in the presence of an acid-activated clay, an aromatic amine having the formula:

$$A-N\begin{matrix}R_2\\|\\R_3\end{matrix}$$

wherein $R_2$ and $R_3$ each is a member selected from the group consisting of hydrogen and lower alkyl; A is a member selected from the group consisting of

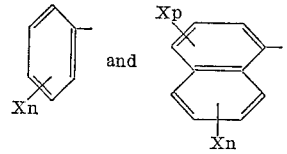

wherein X is a member selected from the group consisting of halogen and lower alkyl radicals containing less than six carbon atoms; $n$ is an integer ranging from 0 to 4 inclusive but not more than two halogen atoms are substituted on the ring; and a substitutable hydrogen atom is present on at least one of the positions ortho and para to the amino substituent; $p$ is an integer of from 0 to 3 inclusive but not more than one halogen atom is substituted on the ring and at least one of the positions ortho and para to the amino group contains a substitutable hydrogen atom and an olefinic hydrocarbon of the formula:

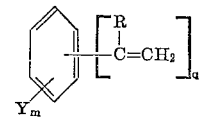

wherein R is a member selected from the group consisting of hydrogen, lower alkyl radicals containing less than six carbon atoms and aralkyl, aryl, substituted aryl and cycloalkyl radicals; Y is a member selected from the group consisting of halogen, amino, substituted amino, and said lower alkyl radicals described herein above; $q$ is an integer ranging from 1 to 3 inclusive; $m$ is an integer ranging from 0 to 4 inclusive and is such that the sum of $m$ and $q$ is less than 7; and when $q$ is greater than 1 the olefin substituents are not positioned on adjacent carbon atoms of the aromatic ring. The reaction which takes place may be represented by the following equation:

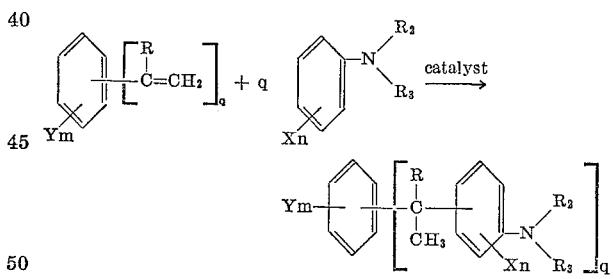

The aralkyl nuclear substitution of the aromatic amine occurs in a position ortho or para to the amine group already present on the aromatic nucleus. In those aromatic amines which are free from both ortho and para substitutents prior to the reaction, the relative ratio of ortho to para substitution is a function of the reaction time with longer periods of time being conducive to greater quantities of the para substitued derivatives and smaller quantities of the ortho. Where the aromatic amine possesses two ortho substituents prior to the reaction, the aralkyl substitution takes place solely at the para position. Conversely, when the para position is blocked by a substituent, aralkyl substitution takes place at the ortho position.

Although the reaction may be carried out using stoichiometric quantities of the reactants, it has been discovered that greater efficiency and higher yields of product are obtained when about 4 to 10 mols of the aromatic amine per mol of the olefinic hydrocarbon are employed.

In addition to the use of monocyclic aromatic amines as disclosed above, the process of the present invention may be used for the aralkyl nuclear substitution of polycyclic aromatic amines of the formula:

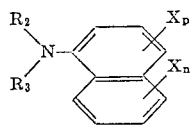

wherein $R_2$, $R_3$ and X have the meanings given above; $p$ is an integer of from 0 to 3 inclusive, but not more than one halogen atom is substituted on the ring, and at least one position either ortho or para to the amino group contains a substitutable hydrogen atom; and $n$ is an integer of from 0 to 4 inclusive, further characterized in that less than three halogen atoms are substituted on the ring. The aralkyl nuclear substitution takes place on the amino substituted ring either ortho or para to the amino group. When a polycyclic amine of the above formula is free of substituents ortho and para to the amino group prior to the reaction, a mixture of ortho and para substituted amines is obtained. If either the ortho or para position is blocked with a substituent, the aralkyl substitution takes place at the one of these positions which contains a substitutable hydrogen atom.

An acid-activated clay is used as catalyst in the process of this invention. Preferably, the clay comprises an acid-activated clay of the bentonite-type. This type of clay contains about 40 to 80 percent by weight of silica and about 3 to 40 percent by weight of alumina, as well as small quantities of one or more oxides of other metals such as iron, magnesium, sodium, calcium, and potassium. We do not fully understand why the acid-activated clay used in the process of the present invention functions as an acid catalyst and yet is too weak an acid to form a salt or similar complex with the amine group of the aromatic compound. Whatever the theory or phenomena involved we found that the use of the catalyst of the present invention overcame the disadvantages of the prior art, i.e. improved yields of salt free products were obtained with recovery of the catalyst for future use.

The presence of water in the acid-activated clay negatively affects its catalytic activity. Hence, the clay must be employed in substantially anhydrous form. This may be effectively accomplished by treating the clay, either before or after its addition, with a suitable low-boiling solvent, such as benzene, toluene, cyclohexane, etc., and then distilling off the water in the form of an azeotrope with the solvent. If the clay on hand is not acid-activated, it may be activated by any suitable procedure. For example, a slurry of one part of weight of clay to 10 parts by weight of 5 percent sulfuric acid solution may be boiled for a period of one hour. The excess spent acid may then be separated from the clay first by settling and decantation and then by wringing the wet clay. The "mud" thus produced may then be dried to a powder in a flash drier. Generally speaking, an amount of acid-activated clay equivalent to about 5 to 30 percent by weight of the aromatic amine reactant is employed, about 8 to 12 percent by weight being preferred.

The reaction may be conveniently carried out at temperatures in the range from about 60 to 190° C., however, particularly outstanding results are obtained if the reaction mixture is maintained within the range of about 100–140° C. Normally the rate of reaction is a function of the particular reagents involved and may vary from as little as about 2 hours for the completion of the reaction, to as long as about 16 to 40 hours for completion depending upon the choice of reagents employed. In those reactions wherein a preponderance of the para substituted aromatic amine is desired, the longer reaction periods, i.e. 16 to 40 hours, are usually employed.

The aralkyl aromatic amines may be recovered from the reaction mass by any convenient means. For example, the reaction mass may be filtered to remove the clay and the crude product may then be purified by means well known in the art such as by distillation, or recrystallization from a suitable solvent. In preferred operation an olefinic hydrocarbon is admixed with an aromatic amine such as N,N-dimethylaniline in the presence of an acid activated clay in anhydrous form. The reaction mixture is then heated at a temperature of about 100–140° C. for a period of about 2 to 40 hours. The resulting reaction mass is filtered to remove the clay and thereafter the filtrate is subjected to distillation whereby the aralkyl nuclear substituted aromatic amine is obtained.

If desired the aralkyl nuclear substituted aromatic amines produced by the process of the present invention may be converted to isocyanates by reaction with phosgene. These isocyanates may in turn be reacted with alcohols to form urethanes and polyurethanes.

The following examples are given for the purpose of illustrating the present invention but are not intended to be limiting on the scope thereof. In the examples, a Dean-Stark apparatus was used in drying the clay by azeotropic distillation in order to return the inert solvent to the reaction mixture.

*Example 1*

A mixture of 100 grams of Filtrol No. 4 (acid-activated bentonite-type clay) and 200 ml. benzene was refluxed to remove the water from the clay by azeotropic distillation. The mixture was then cooled to room temperature and 65.5 grams of p-diisopropenylbenzene and 500 ml. of 2,6-dimethylaniline were added. The reaction mixture was refluxed for 16 hours after which it was cooled to about 80° C. and the clay removed by filtration. Removal of the benzene and excess 2,6-dimethylaniline by distillation gave an 85% yield of crude $\alpha,\alpha'$-bis(3,5-dimethyl-4-aminophenyl)-p-diisopropylbenzene. Recrystallization from isopropanol gave a 70% yield of purified product having a melting point of 148–150° C.

*Example 2*

A mixture of 80 grams of acid-activated P.C. Blue clay (bentonite-type clay containing about 63% of $SiO_2$, 23% of $Al_2O_3$, 9% of $Fe_2O_3$, 3% of CaO and 2% of MgO) and 200 ml. of toluene were refluxed to remove the water from the clay. The mixture was then cooled to 80° C. and 321 grams of N-methylaniline were added. The mixture was then heated to reflux and 40 grams of p-diisopropenylbenzene and 250 ml. of toluene were added dropwise over a two hour period. The reaction mixture was refluxed for an additional 8 hours after which it was cooled to 80° C. and the clay removed by filtration. The filtrate was mixed with 1 liter of 10% aqueous HCl, which was added dropwise thereby forming the insoluble HCl salt of the bis-amine. This insoluble salt was removed by filtration and neutralized with 10% alcoholic KOH: After recrystallization from ethanol there was obtained a 55% yield of $\alpha,\alpha'$-bis(p-N-methylaminophenyl)-p-diisopropylbenzene having an M.P. of 124–125.5° C.

*Example 3*

A mixture of 60 grams of acid-activated P.C. Blue clay catalyst and 150 cc. of toluene were refluxed to dry the clay. The mixture was then cooled to room temperature and 3 mols of N,N-dimethylaniline and 0.2 mol of p-diisopropenylbenzene were added. The reaction mixture was refluxed for 3 hours, after which it was cooled to about 80° C. and the clay removed by filtration. The filtrate was mixed with 1 liter of 10% aqueous HCl, added dropwise, thereby forming an insoluble HCl salt. This salt was removed by filtration and neutralized with 10% alcoholic KOH to give a 73% yield of $\alpha,\alpha'$-bis(N,N-dimethylaminophenyl)-p-diisopropylbenzene. After recrystallization from isopropanol this compound had a melting point of 152–153° C.

*Example 4*

A mixture of 100 grams of acid-activated P. C. Blue clay was refluxed with 100 mls. of toluene until the clay was dry. A solution of 111 grams of p-diisopropenylbenzene in 436 mls. of aniline was then added to the mixture dropwise at 105°–110° C. over a 2 hour period. The reaction mixture was next maintained at 107° C. for a period of 16 hours following which it was cooled to about 80° C. and the clay removed by filtration. The toluene and unreacted aniline were removed from the filtrate by distillation leaving 220 grams of α,α′-bis(4-aminophenyl)-p-diisopropylbenzene having a melting point of 145–150° C.

*Example 5*

A mixture of 100 grams of Filtrol No. 4 and 250 ml. of toluene was dehydrated by azeotropic distillation. Then 356 grams (2.5 mols) of α-naphthylamine and a solution of 32 grams (0.20 mol) of p-diisopropenylbenzene in 150 ml. of benzene were added to the dehydrated mixture maintained at reflux temperature, with agitation. The resulting reaction mixture was then heated at reflux with continued agitation for approximately 18 hours, cooled to room temperature and the clay removed by filtration. After removal of solvents and unreacted α-naphthylamine by distillation, 104 grams of dark colored solid residue were obtained. This was recrystallized from cyclohexane and then from trichloroethylene to give a brownish yellow solid. This product was found to be α,α′-bis(4-aminonaphthyl)-p-diisopropylbenzene having a melting point of 204–207° C.

*Example 6*

Finely divided α,α′-bis(4-aminophenyl)-p-diisopropylbenzene (36.6 g., 0.106 mol) was added over a period of three minutes to a rapidly agitated solution of liquid phosgene (30 ml., 0.4 mol) in toluene (100 ml.) maintained at about −10° C. Additional phosgene was then passed into the mixture at a rate of 0.37 mol per hour over a period of 70 minutes while increasing the temperature from −10° C. to 82° C. during the addition of phosgene. The reaction mixture was then allowed to come to room temperature and after 64 hours, the clear solution was refluxed for one hour whereupon the solution changed from a purple to a brown color. It was then filtered and the filtrate evaporated to dryness under vacuum to yield 42.6 grams of crude product. This was recrystallized successively from 200 ml. of hexane and then from 500 ml. of pentane to yield 31.9 g. (75.9% of theoretical) of α,α′-bis(4-isocyanatophenyl)-p-diisopropylbenzene which melted at 85.5–87° C. Elemental analysis was in good agreement with the theoretical.

Found: 78.86% carbon, 6.22% hydrogen, 7.4% nitrogen. Expected: 78.76% carbon, 6.10% hydrogen, 7.07% nitrogen.

*Example 7*

α,α′-bis(4-isocyanatophenyl)-p-diisopropylbenzene α,α′-bis(4-aminophenyl)-p-diisopropylbenzene (102.5 g., 0.297 mol) was dissolved in dried distilled toluene (1743 grams). Gaseous hydrogen chloride (43 g., 1.2 mols) was then passed into this solution maintained at reflux during a period of two hours. Phosgene (96 g., 0.98 mol) was then passed into the mixture for 85 minutes while maintaining the mixture at reflux. A clear brown mixture resulted which was evaporated under vacuum to give 141 grams of a viscous paste. This crude product was recrystallized from 426 grams of distilled hexane to give 86.1 g. of product melting at 75–79° C. The yield was 73% of theoretical.

*Example 8.—Dimethyl urethane derivative of α,α′-bis-(4-isocyanotophenyl)-p-diisopropylbenzene*

A suspension of anhydrous methanol (10 ml., 0.025 mol) in dry hexane (5.0 ml.) was added to a solution of α,α′-bis(4-isocyanatophenyl)-p-diisopropylbenzene (0.70 g., 0.002 mol) in dry hexane (12.0 ml.). A precipitate began to form in about 15 minutes. After allowing the reaction mixture to stand for 88 hours at room temperatures, 0.75 gram of product was removed by filtration (0.80 g. theoretical). This material was recrystallized from methanol (10 ml.) to yield 0.62 gram of product melting at 166–168° C. It was then crystallized again using toluene (25 ml.) to yield 0.40 gram of product melting at 169–170° C., a final yield of 50% of theoretical based on the diisocyanate used. Elemental analysis was in good agreement with the theoretical.

Found: 73.22% carbon, 7.08% hydrogen, 6.18% nitrogen. Calculated: 73.01% carbon, 7.00% hydrogen, 6.08% nitrogen.

The mother liquors from which the above precipitates had been removed were combined and product maintained therein recovered to give an additional 0.30 gram of product which melted at 166–168° C. This gave an overall yield of 0.70 gram, 88% of theoretical.

*Example 9.—Polyuretane from α,α′-bis(4-isocyanatophenyl)-p-diisopropylbenzene and 1,4-butane-diol*

A solution of α,α′-bis(4-isocyanatophenyl)-p-diisopropylbenzene (10.0 g., 0.0252 mol) and 1,4 butanediol (2.04 g., 0.226 mol) in acetone (60 ml.) was prepared and allowed to stand at room temperature for five days. Removal of volatiles under reduced pressure gave a residue of 11.6 grams of polymer having an inherent viscosity of 0.15 as measured in dimethylformamide at 25° C. (0.5 g., 100 ml.) and a softening point range of 190–198° C. Differential thermal analyses showed endotherm of 130° C. and 205° C. in nitrogen and 150° C. and 297° C. in air. Exotherm in air was 290° C. Yield of product was 96.3% of theoretical.

*Example 10.—Polyurethane from α,α′-bis(4-isocyanatophenyl)-p-diisopropylbenzene and 1,4,-butane-diol*

A solution of α,α′-bis(4-isocyanatophenyl)-p-diisopropylbenzene (52.93 g., 0.133 mol) in dimethylacetamide (175 ml.) stabilized with 0.02 ml. of benzoyl chloride, was added to a solution of 1,4-butanediol (11.82 g., 0.131 mol) in dimethylacetamide (65 ml.) at room temperature. The resultant reaction mixture was then heated for two hours at 80° C. followed by one hour at 120° C. In order to increase the viscosity an additional amount of the isocyanate (0.93 g., 0.0023 mol) was added while heating an additional four hours at 120° C. The reaction mixture was then diluted with two liters of acetone and the product recovered, part by evaporation of the mother liquid. The yield of polyurethane was 60.1 grams, 91.5% of theoretical. It had an inherent viscosity of 1.23 as measured in a 0.5 g./100 ml. of dimethylformamide at 30° C. Softening point in a sealed capillary tube under nitrogen was 150–159° C.

In place of the aromatic amines described in the above examples, there can be substituted other aromatic amines. Suitable other amines include N,N-methylethylaniline; N-methyl-2,6-dichloroaniline; 2-methyl-6-chloroaniline; 3-methylaniline, and 2,6-dichloroaniline.

Illustrative examples of other olefinic hydrocarbons include styrene; 2,4-dichlorostyrene; 2,4-dichloro-α-methylstyrene; 1,3-diisopropenylbenzene and 1,3,5-triisopenylbenzene.

This invention has a number of advantages, the primary one being that aralkyl nuclear substituted aromatic amines can be prepared in a simple and economical manner and in high yield. Further by employing the catalyst of the present invention, the formation of the salt by reaction between the aromatic amine and the acid catalyst is avoided and separation of the catalyst from the reaction mixture can be simply and easily accomplished by a filtration procedure. Moreover, the catalyst itself is non-corrosive to the walls of the reaction vessel thereby obviating the need for the employment of reaction vessels which are specifically designed to withstand the corrosive activity of prior art acid catalysts. A still further advantage is that the catalyst is not destroyed by the reaction and may be recovered and reused.

Although certain preferred embodiments of the invention have been disclosed for purpose of illustration, it will be evident that various changes and modifications may be made therein without departing from the scope and spirit of the invention.

We claim:
1. A process for the production of aromatic amines substituted in the nucleus by at least one aralkyl group which comprises reacting in admixture at a temperature within a range of about 60–140° C. in the presence of an anhydrous acid-activated clay, an aromatic amine having the formula:

wherein $R_2$ and $R_3$ each is a member selected from the group consisting of hydrogen and lower alkyl; A is a member selected from the group consisting of

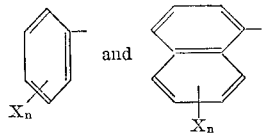

wherein X is a member selected from the group consisting of chlorine and lower alkyl radicals containing less than six carbon atoms; $n$ is an integer ranging from 0 to 2 inclusive; and a substitutable hydrogen atom is present on at least one of the positions ortho and para to the amino substituent and an olefinic hydrocarbon of the structure:

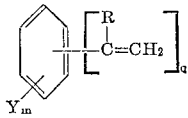

wherein R is a member selected from the group consisting of hydrogen and lower alkyl containing less than six carbon atoms, Y is a member selected from the group consisting of chlorine and lower alkyl containing less than six carbon atoms; $q$ is an integer ranging from 1 to 3 inclusive; $m$ is an integer ranging from 0 to 2 inclusive; and when $q$ is greater than 1, the olefin substituents are positioned on nonadjacent carbon atoms of the aromatic ring.

2. The process of claim 1, wherein said clay is an anhydrous, bentonite-type clay containing from about 40 to 80% by weight of silica and about 3 to 40% by weight of alumina.
3. The process of claim 1 wherein the aromatic amine is aniline.
4. The process of claim 1 wherein the aromatic amine is N-methylaniline.
5. The process of claim 1 wherein the aromatic amine is N,N-dimethylaniline.
6. The process of claim 1 wherein the aromatic amine is N-methyl-2,6-dichloroaniline.
7. The process of claim 1 wherein the aromatic amine is 2,6-dimethylaniline.
8. The process of claim 1 wherein the olefinic hydrocarbon is styrene.
9. The process of claim 1 wherein the olefinic hydrocarbon is 2,4-dichlorostyrene.
10. The process of claim 1 wherein the olefinic hydrocarbon is α-methylstyrene.
11. The process of claim 1 wherein the olefinic hydrocarbon is 2,4-dichloro-α-methylstyrene.
12. The process of claim 1 wherein the olefinic hydrocarbon is 1,4-diisopropenylbenzene.

References Cited

UNITED STATES PATENTS

| 1,908,190 | 5/1933 | Schollkopf. | |
| 3,097,191 | 7/1963 | France et al. | |
| 3,200,152 | 8/1965 | Ruppert et al. | 260—570 |
| 3,267,145 | 8/1966 | Lund et al. | 260—570 |

FOREIGN PATENTS

| 846,226 | 8/1960 | Great Britain. |

OTHER REFERENCES

Groggins: Unit Processes in Organic Synthesis, 1938, second edition, New York, pp. 485–532 (pp. 497 relied on).

Hickinbottom: Chemical Society Journal (London), 1934, pt. 1, pp. 319–323.

CHARLES B. PARKER, *Primary Examiner.*

D. R. MAHANAND, D. H. TORRENCE, R. V. HINES, *Assistant Examiners.*